June 15, 1965  R. A. BILANCIA  3,189,312
ADJUSTABLE VEHICLE SEAT
Filed April 25, 1963  4 Sheets-Sheet 1
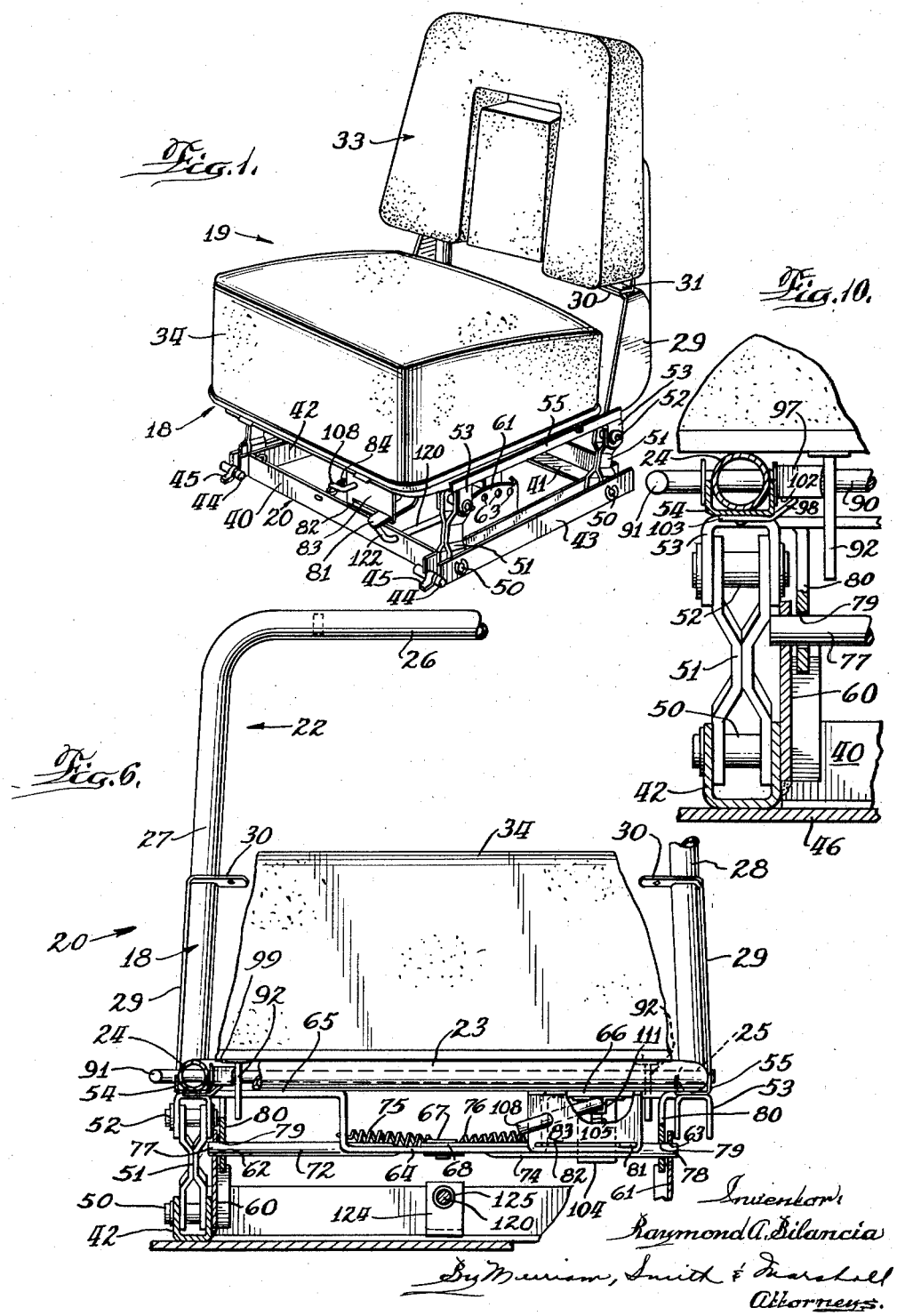

June 15, 1965  R. A. BILANCIA  3,189,312
ADJUSTABLE VEHICLE SEAT
Filed April 25, 1963  4 Sheets-Sheet 2
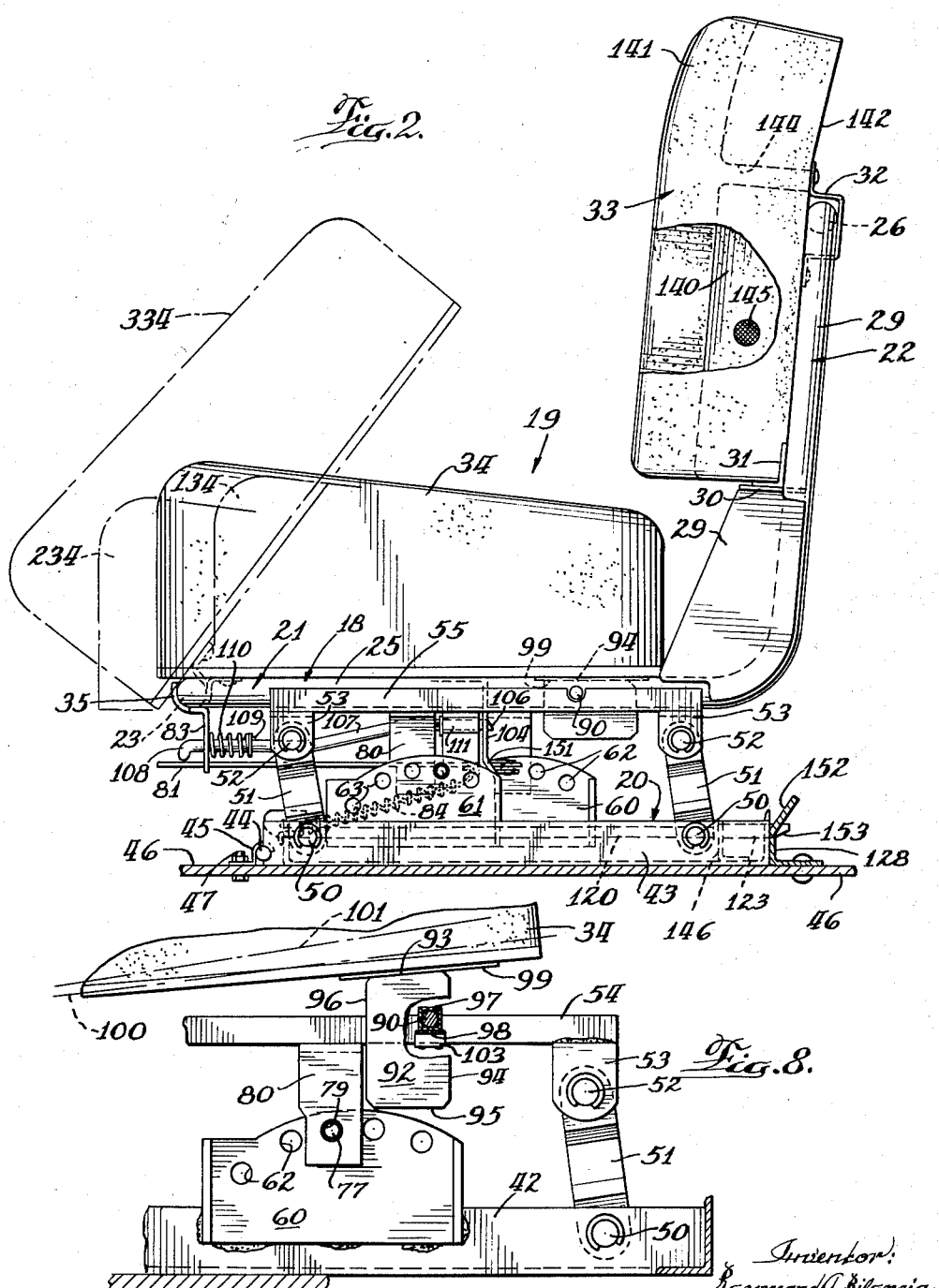
Inventor:
Raymond A. Bilancia
By Merriam, Smith & Marshall
Attorneys.

June 15, 1965  R. A. BILANCIA  3,189,312
ADJUSTABLE VEHICLE SEAT
Filed April 25, 1963  4 Sheets-Sheet 3
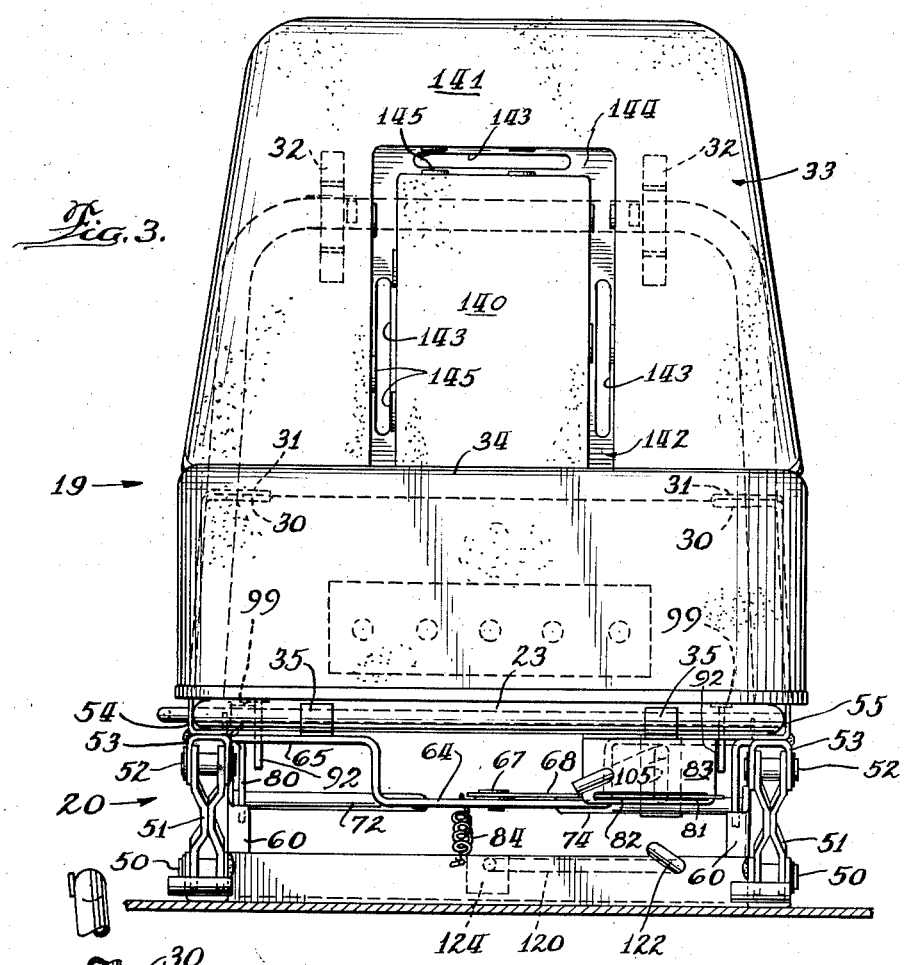
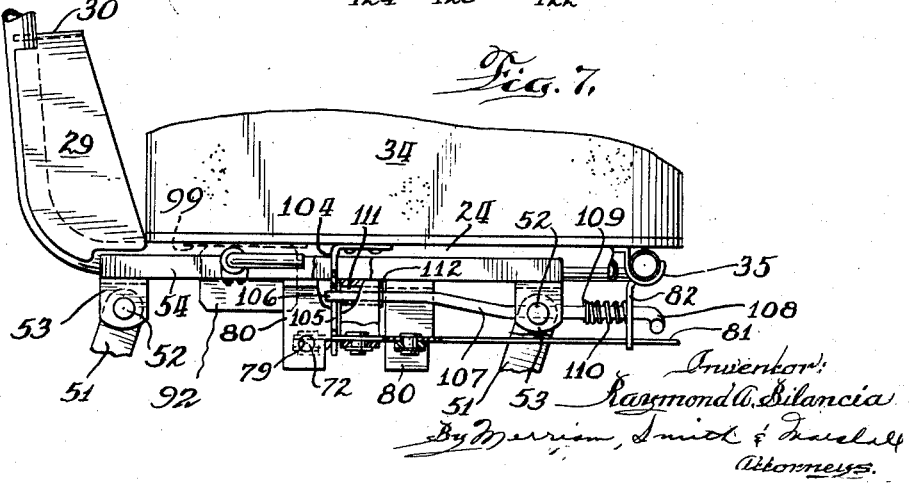
Inventor:
Raymond A. Bilancia
By Merriam, Smith & Ratcliff
Attorneys.

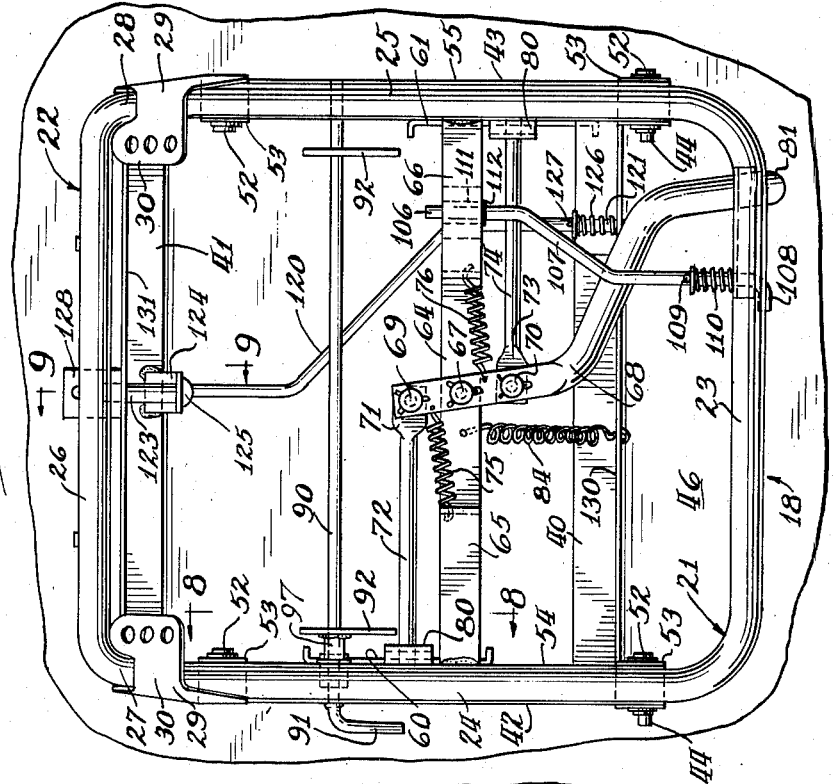

United States Patent Office 3,189,312
Patented June 15, 1965

3,189,312
ADJUSTABLE VEHICLE SEAT
Raymond A. Bilancia, Arlington Heights, Ill., assignor to Coach and Car Equipment Corporation, Chicago, Ill., a corporation of Illinois
Filed Apr. 25, 1963, Ser. No. 275,700
5 Claims. (Cl. 248—394)

The present invention relates generally to adjustable vehicle seats, and more particularly to adjustable vehicle seats in which the adjustable seat is not adversely affected by exposure to dust, dirt, grime, and to the weather.

Typical vehicles utilizing adjustable seats, constructed in accordance with the present invention, are heavy construction equipment, off-the-road vehicles, earth-moving machinery, and the like. In vehicles of this type, it is important that the adjusting mechanism for the seat be of a nature not adversely affected by dirt, grime, dust, and weather conditions to which the seat and the adjusting mechanism are normally exposed. An adjustable vehicle seat constructed in accordance with the present invention incorporates structure, to be subsequently described in detail, which is not adversely affected by dust, dirt, grime, and weather, and which enables the following adjustments to be performed:

(1) Forward and backward adjustment of the seat;
(2) Vertical adjustment of the rear portion of the seat cushion and maintenance of the adjusted position during bouncing of the seat cushion;
(3) Tilting of the seat cushion to a forwardly inclined position in which the seat cushion top is protected from rain or snow; and
(4) Movement of the entire vehicle seat, including most of the adjusting mechanism, from an upright to a tilted position, to facilitate maintenance and repair work on the adjusting mechanism, as well as on whatever mechanism may be located below the vehicle seat.

Other features and advantages are inherent in the structure claimed and disclosed or will become apparent to those skilled in the art from the following detailed description in conjunction with the accompanying drawings wherein:

FIGURE 1 is a perspective view of an embodiment of an adjustable vehicle seat constructed in accordance with the present invention;
FIGURE 2 is a side elevational view of the vehicle seat;
FIGURE 3 is a front view of the seat;
FIGURE 4 is a top plan view of the adjustable vehicle seat, with the seat cushion and back rest removed, illustrating the adjusting mechanism of the seat;
FIGURE 5 is a plan view, similar to FIGURE 4, but with much of the adjusting structure removed;
FIGURE 6 is a fragmentary front elevational view of the vehicle seat, partially in section and partially cut away;
FIGURE 7 is a fragmentary side elevational view, partially in section and partially cut away, illustrating a side of the adjustable vehicle seat opposite that side illustrated in FIGURE 2;
FIGURE 8 is an enlarged sectional view, partially cut away, taken along line 8—8 in FIGURE 4;
FIGURE 9 is a sectional view taken along line 9—9 in FIGURE 4; and
FIGURE 10 is an enlarged fragmentary view, partially broken away, illustrating a portion of the structure illustrated in FIGURE 6.

Referring initially to FIGURES 1-4 and 6, there is illustrated an embodiment of an adjustable seat, indicated generally at 19, and constructed in accordance with the present invention. Vehicle seat 19 includes a lower base portion, indicated generally at 20, atop which is supported seat frame means 18 including a horizontally disposed, tubular U-frame portion indicated generally at 21 (FIG. 4) and integral with a vertically disposed, tubular U-frame portion, indicated generally at 22 (FIG. 6). Horizontally disposed frame portion 21 includes a front part 23 and a pair of side parts 24, 25. Occupant-accommodating means such as a seat cushion 34 is normally supported above, and connected to, horizontally disposed frame portion 21. Attached to the lower front portion of seat cushion 34 are a pair of brackets 35 which mount the seat cushion for pivotal movement about the axis of front part 23 of horizontally disposed frame portion 21.

As shown in FIGURES 4 and 6, vertically disposed frame portion 22 includes a top part 26, and a pair of depending side parts 27, 28. Attached to each side part 27, 28 is a brace plate 29 including an inwardly disposed portion 30. A sectional back rest 33 (FIGS. 1-3) is mounted on vertically disposed frame portion 22 by a pair of brackets 31, each resting on a respective inwardly disposed brace plate portion 30, and by a pair of brackets 32 which attach back rest 35 to top part 26 of vertically disposed frame portion 22.

Located below seat cushion 34 is structure for adjusting the position of the seat in a forward and rearward direction; for vertically adjusting at least the rearward portion of the seat cushion; for tilting the seat cushion to a forwardly inclined position, in which the seat cushion top is protected from rain or snow; and for pivoting substantially the entire vehicle seat 19 to a forwardly tilted position so as to facilitate access to equipment located below the vehicle seat 19, as well as to facilitate maintenance and repair of various components of the adjusting mechanism located below seat cushion 34.

Describing lower base portion 20 now in greater detail, reference is initially directed to FIGURE 5. Base portion 20 includes L-shaped front and rear members 40, 41 respectively and channel-shaped side members 42, 43. Members 40–43 normally rest on the vehicle floor 46. Located at the front of each side member 42, 43 is a respective one of a pair of axially aligned pins 44, and attached to vehicle floor 46 by conventional means 47 are a pair of brackets 45, each of which engages a respective pin 44 to mount base portion 20 and most of the rest of vehicle seat 19 for pivotal movement about the axis of pins 44, from the upright position of FIGURE 2 to a forwardly tilted position (not shown).

Referring to FIGURES 2–4, 6 and 10, there is illustrated structure mounting most of vehicle seat 19, including seat cushion 34 and back rest 33, for movement along an arcuate path between forward and rearward positions for the seat. Mounted between the flanges on each of the channel-shaped lower side members 42, 43, at a forward and rearward portion of each side member, are parallel pins 50, four in all. Pivotally mounted on each pin 50 is the lower portion of one of four parallel link members 51 each having an upper portion pivotally mounted upon one of four parallel upper pins 52 each extending between the downwardly disposed flanges of one of four brackets 53, each of which is mounted at a respective front or rear portion of a respective one of a pair of channel-shaped upper side member 54, 55. Link members 51 all have the same length between pins 50 and 52. Channel-shaped upper side members 54, 55 receive and support sides 24, 25 respectively of horizontally disposed tubular U-frame portion 21, in turn supporting seat cushion 34. Pins 50 and 52 are parallel. Thus, with the exception of lower members 40–43 and the components immovably attached thereto, all of vehicle seat 19 is movable in forward and rearward directions along a horizontally extending, vertically arcuate, upwardly convex path. The axes of front pins 52 lie in the same horizontal plane as the axes of rear pins 52 no matter the location of seat 19 along its arcuate path of movement.

Referring to FIGURES 2–4, 8 and 10, there is now to be described structure normally locking vehicle seat 19 against forward or rearward movement, but which is actuable to an unlocked condition to facilitate such movement.

Immovably attached to the inner surface of each lower channel-shaped side member 42, 43 of base portion 20, is one of a pair of stationary lock means in the form of plates 60, 61 each having a plurality of openings 62, 63, respectively, all arranged in an arc corresponding to the arcuate path of movement of the seat frame and located about a center remote from the pivotal axes of the link members, i.e., the axes of pins 50, 52.

Extending between upper channel-shaped side members 54, 55 is a cross member including a depressed portion 64 and a pair of elevated portions 65, 66, one on each side of depressed portion 64 (FIGS. 3 and 4). Pivotally mounted on a cross member depressed portion 64, at 67, is an S-shaped member 68. Pivotally mounted on S-shaped member 68 at 69, to one side of pivotal mounting 67, is the inner end 71 of a rod or latch element 72. Also pivotally mounted on member 68, at 70, to the other side of pivotal mounting 67, is the inner end 73 of a rod or latch element 74. Extending between S-shaped member 68 and respective elevated portions 65, 66 of the cross member are a pair of coil springs 75, 76, respectively, each disposed to urge S-shaped member 68 in a counterclockwise sense about pivotal mounting 67, as viewed in FIGURE 4.

Referring to FIGURES 6 and 8, each rod 72, 74 has an outer end portion 77, 78 respectively, each normally received in one of the openings 62, 63 in plates 60, 61 respectively, thereby lockingly engaging the forwardly and rearwardly movable portions of seat 19 to the relatively immovable lower members 40–43. Thus, openings 62, 63 constitute engaging means as well as locations of engagement for the latch elements 72, 74. Each rod 72, 74 normally extends through, and is retained in, an opening 79 in one of a pair of brackets 80, each depending from a respective upper channel-shaped side member 54, 55. Brackets 80 align rod outer ends 77, 78 with openings 62, 63. Rod outer ends 77, 78 and lock plate openings 62, 63 cooperate to transmit (by way of members 65 and 68 and rods 72, 74 and lock plates 60, 61) some of the load on the seat frame to parts of the base portion remote from the connections of pivot pins 50, and this is performed for all locations of engagement of the latch element.

With reference to FIGURES 1–4, the front or handle portion 81 of S-shaped member 68 extends forwardly through a vertically disposed slot 82 in a flange 83 depending from front part 23 of horizontally disposed, tubular, U-shaped frame portion 21. Handle portion 81 is normally maintained in the position illustrated in FIGURE 4, due to the action of the springs 75, 76.

To unlock vehicle seat 19, for movement thereof in a forward or rearward direction, one need merely grasp handle portion 81 of S-shaped member 68, and pivot the member about pivotal mounting 67 in a clockwise sense from the position indicated in FIGURE 4. This movement of S-shaped member 68 in turn causes rods 72, 74 to be retracted inwardly, thus withdrawing the respective rod outer ends 77, 78 from engagement with openings 62, 63 in plates 60, 61.

By virture of pivotal mountings, including pins 50, link members 51 and pins 52 (all previously described), the vehicle seat is mounted for movement along a path defined by an arc parallel to an arc passing through the center points of openings 62 or 63. A spring 84 extending between cross member depressed portion 64 and lower front member 40 normally urges the vehicle seat through such an arc and in a forward direction and this occurs unless the seat is in a position where the urging of the spring has no effect, e.g., if the seat is in its forwardmost position. The seat is allowed to move forwardly until a desired position is reached at which time handle portion 81 of member 68 is released. Springs 75, 76 then exert their normal action and urge member 68 in a counterclockwise sense about the axis of pivotal mounting 67, as viewed in FIGURE 4. Consequently, rods, 72, 74 are urged in an outwardly direction and the rod outer ends 77, 78 engage a respective opening 62, 63 in plates 60, 61 to lock the vehicle seat against forward or rearward movement.

If it is desired to move the seat cushion 34 in a rearward direction, against the urging of spring 84, the occupant of the seat need only press his feet against the floor and push backwardly against back rest 33, while at the same time holding handle portion 81 of S-shaped member 68 in a position to the left of that position shown in FIGURE 4. When the desired, more rearwardly disposed position is obtained, the occupant need only release handle portion 81 and the rod outer ends 77, 78 will engage, in a desired, more rearward opening, as previously explained.

Thus, by virtue of the structure herein described, the vehicle seat may be adjusted from a position in which the seat cushion is disposed as indicated in full lines at 34 in FIGURE 2, to a plurality of other positions including those in which the seat cushion is disposed as indicated in the dash-dot lines 134 and 234 in FIGURE 2.

The above described structure and its movement are not adversely affected by dust, dirt, grime or weather, as would be the case with structure composed of members mounted for slidable movement.

It should be noted that the adjusting mechanisms previously described enable adjustment of the vehicle seat and of seat cushion 34 not only in forward and rearward directions, but also enable a slight adjustment in the height of seat cushion 34. Additional means for adjusting the vertical position of at least the rearward portion of seat cushion 34 are now to be described.

Referring to FIGURES 4, 7, 8 and 10, extending through side parts 24, 25 of horizontally disposed, tubular, U-shaped frame portion 21, and pivotally mounted on upper channel-shaped side members 54, 55, is a rod 90 having a handle 91 located adjacent upper channel-shaped side member 54 on the outside thereof. Mounted on rod 90, adjacent respective opposite ends thereof, but inwardly of side members 54, 55, are a pair of polygonal plates 92, in this embodiment each having four side edges 93–96 respectively (FIG. 8). Rod 90 extends through a plate 92 at a location spaced a different radial distance from each of the respective side edges 93–96 of plate 92. One side edge of plate 92 at all times normally engages the bottom of seat cushion 34 (FIG. 8), e.g., at a plate 99 located at the seat cushion bottom.

As shown in FIGURES 2 and 8, plate 92 normally engages a rearwardly disposed portion of the bottom of seat cushion 34 and supports said rearward portion. The front portion of the cushion is mounted for pivotal movement about the axis of the front part 23 of the tubular frame portion, as previously described. The rearward portion of seat cushion 34 may be vertically adjusted to various heights depending upon the particular side edge of plate 92 upon which the bottom of seat cushion 34 is supported. For example, as shown in FIGURE 8, the radial distance between the axis of rod 90 and side edge 94 is smaller than the radial distance between rod 90 and any of the other side edges. Thus, if side edge 94 engages the bottom of seat cushion 34, as in FIGURE 2, then the rearward portion of seat cushion 34 is disposed at the lowest vertical position which can be obtained for any given forward or rearward position of seat cushion 34. In this position the seat cushion may also rest on side parts 24, 25 of the tubular frame portion. When side edge 93 engages the bottom of seat cushion 34, as in FIGURE 8, the extent to which the rear portion of seat cushion 34 is elevated is greater than that obtainable when side edge 94 engages plate 99. Rotating plates 92 to a position wherein side edge 96 engages plate 99, elevates the rear portion of seat cushion 34 still further (dash-dot lines 100 in FIG. 8); and rotating plate 92 to a position where side edge 95 engages seat cushion bottom plate 99 will elevate the rearward portion of seat cushion 34 to the highest position obtainable (dash-dot lines 101 in FIG. 8).

The vehicle on which seat 19 is intended to be mounted, is normally operated over rough terrain which may cause the rearward portion of vehicle seat cushion 34 to bounce up and down with respect to plates 92. To prevent the downward striking force of bouncing seat cushion 34 from urging plates 92 to rotate out of the desired positions thereof, the following means are provided.

Referring to FIGURES 8 and 10, coaxially secured about rod 90, adjacent rod handle 91, between a plate 92 and upper channel-shaped side member 54 is a polygonal cross-sectional tubular portion 97 having the same number of side surfaces (four) as plates 92 have side edges. Pressingly engaging the lowermost surface 102 of tubular portion 97 is a free end 98 of a leaf spring 103 attached to the bottom of upper channel-shaped side member 54. The engagement of spring end 98 with lowermost surface 102 of tubular portion 97, and the securement of tubular portion 97 to rod 90, prevents the bouncing action of seat cushion 34 from rotating rod 90 and associated plates 92 out of a desired position thereof. However, the engagement of spring end 98 with surface 102 is not sufficient to prevent rotation of rod 92 when handle 91 is grasped and rotated by one desiring to adjust the vertical position of the rearward portion of seat cushion 34.

When the vehicle, upon which seat 19 is mounted, is in a rest condition (e.g., at night), it is desirable to tilt seat cushion 34 to a position which will protect the seat cushion from exposure to rain or snow, and structure to facilitate this is now to be described.

As previously indicated, the engagement of the seat cushion's lower front brackets 35 on front part 23 of horizontally disposed, tubular, U-shaped frame portion 21 mounts seat cushion 34 for pivotal movement about the axis of front part 23, from the upright position indicated in solid lines in FIGURE 2 to an inclined, tilted position such as that indicated by the dash-dot lines 334 in FIGURE 2. Normally, seat cushion 34 is locked in the upright position by means illustrated in FIGURES 4, 6 and 7, and now to be described.

Depending from the bottom of seat cushion 34 is a bracket 104 having a vertically disposed slot 105. Normally, extending through slot 105 is the rearward end 106 of a rod 107 having a forward end 108 extending slidably through the flange 83 depending downwardly from front part 23 of horizontally disposed, tubular, U-shaped frame portion 21. Rod 107 also extends through a retainer 111 mounted to the bottom of cross member elevated portion 66. Disposed around rod 107, between flange 83, and a pin 109 on rod 107 is a coil spring 110 which normally urges rod 107 in a rearward direction to the position illustrated in FIGURE 4, wherein rearward end 106 of rod 107 extends through vertically disposed slot 105 in depending bracket 104. Because bracket 104 is attached to the bottom of seat cushion 34, the engagement of rod end 106 in slot 105 normally prevents seat cushion 34 from being tilted to a substantially inclined position. However, the depth of slot 105 is sufficient to enable a vertical adjustment of the rearward portion of seat cushion 34 to any of the desired positions obtainable by virtue of rotation of rod 90 and plates 92.

To enable tilting of seat cushion 34 to an inclined position, the operator merely grasps the forward end 108 of rod 107, pulls the end outwardly, thereby withdrawing the rearward rod end 106 from the slot 105 in bracket 104 and disengaging the rod from any locking connection with the seat cushion. The unlocked seat cushion 34 may then be tilted through the position illustrated by the dot-dash lines 334 in FIGURE 2 to a substantially forwardly inclined position. When the tilted cushion is to be returned to the upright position shown in solid lines in FIGURE 2, the cushion is merely lowered. As the cushion drops, an inclined portion 151 on bracket 104 initially engages the tapered rear end 106 of rod 107 and urges the latter in a forward direction. When the cushion is in its lowermost position, spring 110 urges rod 107 in a rearward direction to the position illustrated in FIGURE 2. A collar 112 on rod 107, adjacent rearward end 106 thereof, engages retainer 111 and limits movement of rod 107 in a rearward direction.

As previously indicated, the entire vehicle seat 19 may be pivoted forwardly, to a tilted position, about the axis of pins 44, secured to the forward ends of lower side members 42, 43 and engaged by brackets 45 mounted on vehicle floor 46. This ability to tilt seat 19 facilitates maintenance and repair of the structural components of the adjusting mechanisms located below seat cushion 34, and enables access to parts of the equipment located below floor 46 (e.g., in a situation where a trap door is located below seat 19).

Normally, seat 19 is locked in the upright position shown in FIGURE 2 by structure, illustrated in FIGURES 2, 5 and 9, and including a rod 120 extending between lower front member 40 and lower rear member 41. Rod 120 includes a front portion 121 extending slidably through the vertical flange 130 of front member 40, and a rear portion 123 extending slidably through the vertical flange 131 of rear member 41. Rod rear portion 123 also extends slidably through a vertical flange 146 on a bracket 124 secured to rear member 41, as by welding; and mounted on rod 120, inwardly of bracket flange 146, is a collar 125 for engaging the innermost surface of flange 146 to limit sliding rearward movement of rod 120. Rod 120 is normally urged in a rearward direction by a coil spring 126 slidably mounted around front portion 121 of rod 120 and extending between the vertical flange 130 of front member 40 and a pin 127 on rod 120.

Fixed to floor 46, behind lower rear member 41, is a bracket 128 including an opening 129 through which the rearward end 123 of rod 120 normally extends due to the action of coil spring 126. Engagement of rod rear portion 123 in the opening 129 of bracket 128, in turn fixed to floor 46, normally locks seat 19 in the upright position of FIGURE 2 and prevents tilting movement of seat 19 about the axis of pins 44.

To release this locking engagement, one need merely grasp the rod handle 122, integral with front portion 121 of rod 120, and pull rod 120 slidably forwardly. This frees the engagement of rod rearward portion 123 with bracket 128 so that the seat is free to be pivoted about the axis of pin 44 to a forwardly tilted position.

To return seat 19 from the tilted to the upright position indicated in FIGURE 2, one need merely lower the seat. As the seat drops, an inclined portion 152 on bracket 128 (FIG. 9) initially engages a tapered end 153 on rod rear portion 123 to initially urge rod 120 in a forward direction. When the seat is in its lowermost position, coil spring 126 urges rod 120 in a rearward direction, thereby effecting engagement of rod rear portion 123 with the opening 129 in bracket 128.

The detailed construction of seat back 33 is best illustrated in FIGURES 2 and 3. Seat back 33 comprises a central rectangular portion 140, and an inverted, U-shaped, peripheral portion 141. Both portions 140, 141 are mounted on a back plate 142, and seat back portions 140, 141 are spaced apart to define, together with back plate 142, an inverted, U-shaped channel 144. Back plates 142 include a plurality of elongated slots 143, each located at the inner surface of a respective part of U-shaped channel 144. Located in the sides of seat back portions 140, 141, in communication with channel 144, are a plurality of perforated grommets 145. Perforated grommets 145 facilitate circulation of cooling or ventilating air into and through channel 144 and against the back of the seat occupant in response to the application and relaxation of pressure against seat back 33. Channel 144 and slots 143 further facilitate circulation of ventilating air toward the back of the occupant of seat 19.

There has thus been described an adjustable vehicle seat, including: structure mounting the seat for movement in forward or rearward directions, which structure is not adversely affected by accumulations of dust, dirt, or grime; structure enabling a seat cushion to be pivoted to an upwardly and forwardly tilted position; structure enabling adjustment of the rearward portion of the seat cushion to a plurality of vertical or elevated positions; and structure enabling pivotal movement of the entire vehicle seat to a forwardly tilted position. Moreover, further structure is provided to prevent the bouncing action of the seat cushion from moving the rearward portion of the seat cushion from a desired vertically adjusted position.

The foregoing detailed description has been given for clearness of understanding only, and no unnecessary limitations should be understood therefrom, as modifications will be obvious to those skilled in the art.

What is claimed is:

1. In a seat:
a base portion;
seat frame means located above said base portion;
means mounting said seat frame means for movement, relative to the base portion, along a horizontally extending, vertically arcuate path;
means normally urging the seat frame means along said path;
a rod;
means mounting said rod to said seat frame means in a horizontal disposition for the rod and in which the rod extends transversely relative to said path;
lock means attached to the base portion and including a plurality of means for engaging one end portion of said rod;
said engaging means for the rod's one end portion being arranged in a horizontally extending, vertical arc corresponding to said path of movement of the seat frame means;
a cross member attached to the seat frame means and extending in substantially the same direction as said rod;
an elongated member extending transversely to said cross member;
means mounting said elongated member on said cross member for pivotal movement of the former about a normally vertically disposed first axis located between the ends of the elongated member;
said rod-mounting means including means pivotally mounting the other end portion of said rod, opposite said one end portion thereof, on said elongated member at a location on the latter spaced from said first pivotal axis, for movement of said rod between a first position, in which the rod's one end portion is engaged by one of the engaging means on the lock means, and a disengaged second position, and mounting said rod for movement with said seat frame means;
and spring means, on said seat frame means, normally urging said elongated member in a pivotal sense to urge said rod toward its first position.

2. In a seat:
seat frame means including a seat frame horizontal portion having a front part and a pair of side parts extending rearwardly from said front part;
occupant-accommodating means located above said seat frame horizontal portion;
means, located at the front portion of said occupant-accommodating means, mounting the latter for pivotal movement about a horizontal axis extending along the front part of said seat frame horizontal portion;
a horizontally disposed rod extending between said side parts of the seat frame horizontal portion;
means on said side parts mounting said rod for rotation about its axis;
polygonal plate means fixedly mounted on said rod and having a plurality of side edges, one of which normally engages the bottom of a portion of the occupant-accommodating means rearward of the front portion thereof;
the radial distance between the axis of said rod and any one of said side edges being different than the distance between the rod axis and any other side edge;
a tubular element, having a polygonal cross-section, fixed coaxially about a portion of said rod and rotatable therewith, said tubular element having the same number of side surfaces as said plate means has side edges;
and means, connected to said seat frame means, for engaging a surface of said tubular element to prevent rotation of the rod due to bouncing of the occupant-accommodating means.

3. In a seat as recited in claim 2 wherein said last recited means comprises:
leaf spring means, having one end connected to said seat frame means at a side part and a free end extending inwardly from said side part for engaging the lowermost surface of said tubular element.

4. In combination with a floor:
a seat including a base portion;
seat frame means located above said base portion;
means mounting said seat frame means to the base portion;
means at the forward end of said base portion defining a horizontally disposed pivotal axis;
means connecting said axis-defining means to said floor and mounting said base portion for pivotal movement, together with the rest of said seat, about said axis between an upright position and a forwardly tilted position;
a rod having front and rear portions;
means mounting said rod on said base portion for slidable movement of the rod along its axis between more rearwardly extended and more forwardly retracted rod positions;
bracket means, on said floor, including means for engaging said rear end portion of said rod when the rod is in its extended position;
and means on the seat normally urging said rod toward its extended position.

5. In a seat:
a base portion;
seat frame means located above said base portion;
a pair of parallel link members, one behind the other, each extending between the base portion and the seat frame means;
a pair of means each pivotally connecting a lower end portion of a respective one of said link members to the base portion for pivotal movement of the link member about a respective one of a pair of horizontal first axes extending from side to side of the vehicle seat;
a pair of means each pivotally connecting an upper end portion of a respective one of the link members to the seat frame means for pivotal movement of the link member about a respective one of a pair of parallel second axes parallel to said first axis;
said link members having the same length between their respective first and second axes, whereby said seat frame means is mounted on said base portion for movement of the seat frame means, relative to the base portion, along a horizontally extending, vertically arcuate, upwardly convex path;
means normally urging the seat frame means along said path;
a latch element;
means connecting said latch element to said seat frame means for movement of the former with the latter;
stationary lock means immovably attached to the base portion and including a plurality of latch element-engaging means each defining a respective location of engagement for said latch element;
said latch element-engaging means being arranged in a horizontally extending, vertically arcuate, upwardly convex sequence corresponding to said path of movement of the seat frame means;
the arc of said sequence having a center remote from each of said pivotal axes of the link members;
said latch element and said latch element-engaging means including means cooperable to transmit some of the load on the seat frame means, through said latch element and said latch element-engaging means, to parts of the base portion remote from the pivotal connections on the base portion, for all locations of engagement of the latch element;
and means mounting said latch element for movement, relative to the seat frame means, between a first position in which the latch element is engaged with one of said latch element-engaging means and a disengaged second position.

References Cited by the Examiner

UNITED STATES PATENTS

| | | | |
|---|---|---|---|
| 740,897 | 10/03 | MacAlman | 296—65 |
| 2,111,519 | 3/38 | Whedon et al. | 248—419 |
| 2,179,085 | 11/39 | De Rose | 248—394 |
| 2,227,764 | 1/41 | Saunders et al. | 248—397 |
| 2,235,237 | 3/41 | Saunders et al. | 249—419 |
| 2,260,032 | 10/41 | Kaiser et al. | 248—419 X |
| 2,302,387 | 11/42 | Greeno et al. | 248—371 X |
| 2,586,012 | 2/52 | Dorton | 248—419 X |
| 2,748,835 | 6/56 | Barecki | 248—397 |
| 3,049,330 | 8/62 | Coons et al. | 248—419 |

FOREIGN PATENTS

| | | |
|---|---|---|
| 584,061 | 1/47 | Great Britain. |
| 1,161,104 | 3/58 | France. |

A. HARRY LEVY, *Primary Examiner.*

LEO FRIAGLIA, *Examiner.*